(12) United States Patent
Chen et al.

(10) Patent No.: US 6,681,347 B1
(45) Date of Patent: Jan. 20, 2004

(54) METHOD FOR TESTING KEYBOARD COMPLIED WITH LANGUAGE CODE

(75) Inventors: S-Tong Chen, Taipei (TW); Kuang-Shin Lin, Taipei (TW)

(73) Assignee: Inventec Corp., Taipei (TW)

( * ) Notice: Subject to any disclaimer, the term of this patent is extended or adjusted under 35 U.S.C. 154(b) by 533 days.

(21) Appl. No.: 09/708,101

(22) Filed: Nov. 6, 2000

(51) Int. Cl.⁷ .................................. G09G 5/00
(52) U.S. Cl. ................ 714/44; 345/168; 345/171; 341/22; 341/24; 341/28; 702/120
(58) Field of Search ................ 714/44; 341/22, 341/24, 28; 702/120; 345/168, 171

(56) References Cited

U.S. PATENT DOCUMENTS

| | | | | |
|---|---|---|---|---|
| 5,387,042 A | * | 2/1995 | Brown | 400/477 |
| 5,827,983 A | * | 10/1998 | Ortoli | 73/865.3 |
| 6,011,495 A | * | 1/2000 | Chen | 341/22 |
| 6,275,216 B1 | * | 8/2001 | Kitamura | 345/168 |
| 6,281,886 B1 | * | 8/2001 | Ranieri | 345/173 |
| 6,304,830 B1 | * | 10/2001 | Lee | 702/114 |
| 6,326,953 B1 | * | 12/2001 | Wana | 345/168 |
| 6,438,699 B1 | * | 8/2002 | Cato et al. | 713/323 |
| 6,456,277 B1 | * | 9/2002 | Satoh et al. | 345/168 |
| 6,535,931 B1 | * | 3/2003 | Celi, Jr. | 710/1 |
| 6,615,287 B1 | * | 9/2003 | Behrens et al. | 710/8 |

* cited by examiner

*Primary Examiner*—Scott Baderman
*Assistant Examiner*—Anne L. Damiano
(74) *Attorney, Agent, or Firm*—Bacon & Thomas, PLLC

(57) ABSTRACT

A method for testing a keyboard complied with a language code table comprises the steps of reading an embedded language code of the keyboard to be tested through a central processing unit (CPU), comparing the read language code with the language code table stored in memory in order to determine whether there is a matched one, reading an application program interface (API) function from the keyboard to be tested by the CPU, identifying a type of the keyboard to be tested by a "Get Keyboard Type" of the API function, reading exchange codes of special keys from the keyboard to be tested by the CPU, identifying a model of the keyboard to be tested, selecting a keyboard test software corresponding to the language code, the type, and the model of the keyboard to be tested from a test software database stored in memory, and performing a test on each key on the keyboard by the selected keyboard test software. This may avoid an error determination of keyboard to be tested due to the inappropriate use of test software.

4 Claims, 1 Drawing Sheet

METHOD FOR TESTING KEYBOARD COMPLIED WITH LANGUAGE CODE

FIELD OF THE INVENTION

The present invention relates to keyboard test methods and more particularly to a method for testing keyboard complied with language code.

BACKGROUND OF THE INVENTION

Conventionally, a keyboard is required to pass a test prior to delivery. Typically, a standardized keyboard test software is employed to perform a test on every key on the keyboard.

But this is unsatisfactory for the purpose for which the invention is concerned for the following reasons. It is known that keyboards may be classified as a variety of keyboards based on corresponding languages, key arrangements, the number of keys, etc. Thus, it is understood that the layout of keyboard to be tested may not comply with that of keyboard complied with standardized test software if such standardized test software is employed to perform tests on the variety of keyboards. This may result in an indication that the tested keyboard is malfunctioned. However, the tested keyboard may not malfunction in fact. The problem is the inappropriate test method.

SUMMARY OF THE INVENTION

It is thus an object of the present invention to provide a method for testing a keyboard complied with a language code table comprising the steps of 1) reading an embedded language code of the keyboard to be tested through a central processing unit (CPU), b) comparing the read language code with the language code table stored in memory in order to determine whether there is a matched one, c) reading an application program interface (API) function from the keyboard to be tested by the CPU, d) identifying a type of the keyboard to be tested by a "Get Keyboard Type" function of the API, e) reading exchange codes of special keys from the keyboard to be tested by the CPU, f) identifying a model of the keyboard to be tested from the exchange codes, g) searching a test software database stored in memory for a keyboard test software corresponding to the language code, the type, and the model of the keyboard to be tested, and h) performing a test on each key on the keyboard by the searched keyboard test software.

The above and other objects, features and advantages of the present invention will become apparent from the following detailed description taken with the accompanying drawings.

DETAILED DESCRIPTION OF THE PREFERRED EMBODIMENTS

Figure 1:
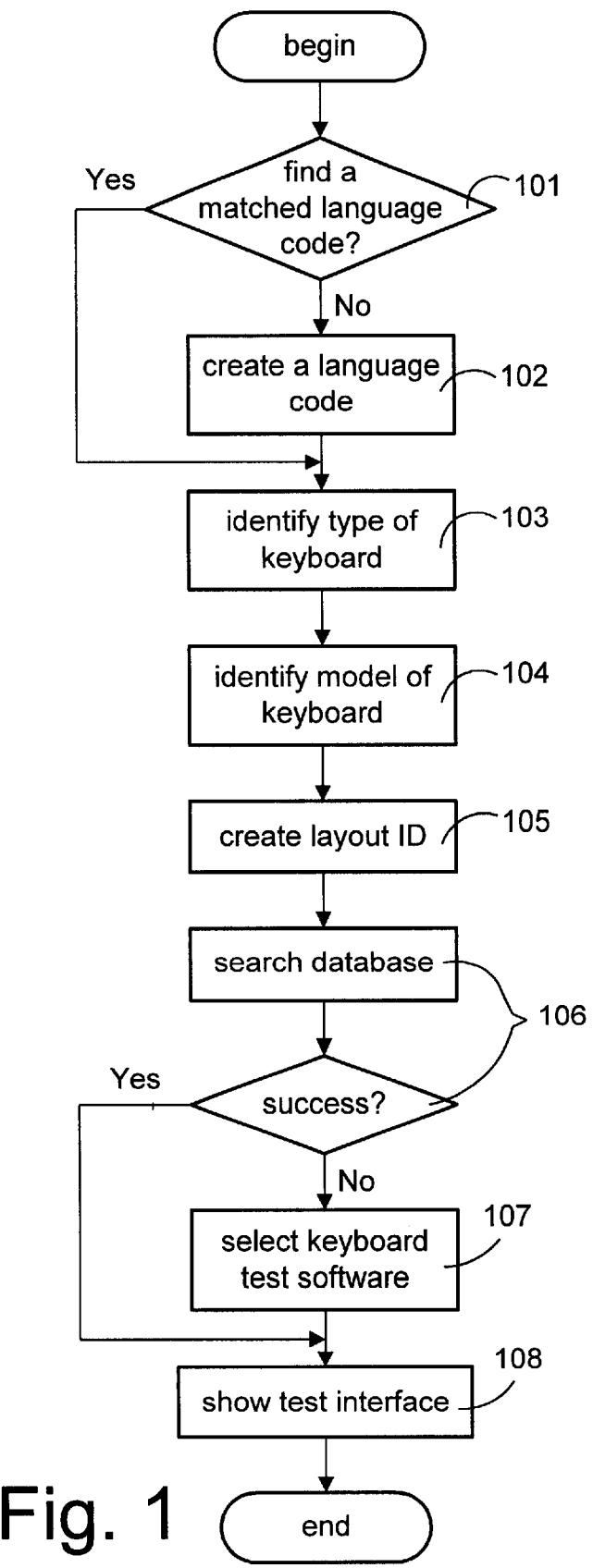
FIG. 1 is a flow chart illustrating the process for testing keyboard complied with language code according to the invention.

The keyboard test process goes through every key on the keyboard of a computer (e.g., notebook computer) to be tested. Also, a language code table and a test software database are required to store in memory in advance.

Referring to FIG. 1, the process in accordance with the invention is performed as follows.

In step 101, read the embedded language code of a keyboard to be tested through a central processing unit (CPU). Next, the read language code is compared with the language code table stored in memory in order to determine whether there is a match. If yes, read the corresponding language code and the process goes to step 103. If not, the process goes to step 102.

In step 102, read the stored language code table from memory through CPU. Next, create a language code which is not found in the read language code table. The created language code is the new language code of the keyboard to be tested.

In step 103, CPU reads an application program interface (API) function from the keyboard to be tested. Then, identify the type of the keyboard to be tested by the "Get Keyboard Type" of API function.

In step 104, CPU reads exchange codes of special keys (e.g., programmable keys, function keys, etc.) from the keyboard to be tested. Then, identify the model of the keyboard to be tested.

In step 105, A layout identification (ID) is created after language code, type, and model of the keyboard to be tested are obtained through CPU.

In step 106, CPU reads test software database stored in memory. Then, the layout ID of the keyboard to be tested is compared with the read test software database in order to determine whether there is a test software corresponding to the keyboard to be tested. If yes, the process goes to step 108. If not, the process goes to step 107.

In step 107, CPU selects a known test software from the test software database as keyboard test software. In step 108, CPU shows the obtained keyboard layout of keyboard test software through a display. As a result, a test clerk may perform a test on every key on the keyboard by viewing the keyboard layout shown on the display.

While the invention herein disclosed has been described by means of specific embodiments, numerous modifications and variations could be made thereto by those skilled in the art without departing from the scope and spirit of the invention set forth in the claims.

What is claimed is:

1. A method for testing a keyboard complied with a language code table which together with a test software database are stored in memory, the method comprising the steps of:

reading an embedded language code of the keyboard to be tested through a central processing unit (CPU);

comparing the read language code with the language code table stored in memory by the CPU in order to determine whether there is a matched language code;

reading an application program interface (API) function from the keyboard to be tested;

identifying a type of the keyboard to be tested by the API function;

reading exchange codes of special keys from the keyboard to be tested;

identifying a model of the keyboard to be tested from the read exchange codes;

reading a test software database stored in memory;

searching the test software database for a keyboard test software corresponding to the language code, the type, and the model of the keyboard to be tested by the CPU;

performing a test on the keyboard by the searched keyboard test software; and reading the stored language code table from memory if the CPU determines that there is no matched language code, and creating a language code which is not found in the read language code table as the language code of the keyboard to be tested.

2. A method for testing a keyboard complied with a language code table which together with a test software database are stored in memory, the method comprising the steps of:

reading an embedded language code of the keyboard to be tested through a central processing unit (CPU);

comparing the read language code with the language code table stored in memory by the CPU in order to determine whether there is a matched language code;

reading an application program interface (API) function from the keyboard to be tested;

identifying a type of the keyboard to be tested by the API function;

reading exchange codes of special keys from the keyboard to be tested;

identifying a model of the keyboard to be tested from the read exchange codes;

reading a test software database stored in memory;

searching the test software database for a keyboard test software corresponding to the language code, the type, and the model of the keyboard to be tested by the CPU;

performing a test on the keyboard by the searched keyboard test software; and creating a layout identification after the language code, the type, and the model of the keyboard to be tested are obtained through the CPU.

3. A method for testing a keyboard complied with a language code table which together with a test software database are stored in memory, the method comprising the steps of:

reading an embedded language code of the keyboard to be tested through a central processing unit (CPU);

comparing the read language code with the language code table stored in memory by the CPU in order to determine whether there is a matched language code;

reading an application program interface (API) function from the keyboard to be tested;

identifying a type of the keyboard to be tested by the API function;

reading exchange codes of special keys from the keyboard to be tested;

identifying a model of the keyboard to be tested from the read exchange codes;

reading a test software database stored in memory;

searching the test software database for a keyboard test software corresponding to the language code, the type, and the model of the keyboard to be tested by the CPU;

performing a test on the keyboard by the searched keyboard test software; and selecting a test software from the test software database as keyboard test software if the searching step fails.

4. The method of claim 3, further comprising the step of showing the keyboard layout of the keyboard test software through a display by the CPU, thereby performing a test on each key on the keyboard by viewing the keyboard layout shown on the display.

* * * * *